US006843619B2

(12) United States Patent
Gelmi

(10) Patent No.: US 6,843,619 B2
(45) Date of Patent: Jan. 18, 2005

(54) APPARATUS ABLE TYPICALLY TO TRANSFORM A FRAME MOUNTED ON CRAWLER TRACKS INTO A PIPE PLAYING MACHINE

(75) Inventor: Giuliano Gelmi, Sorbolo (IT)

(73) Assignee: Coris Di Gelmi Ing. Giuliano Societa in Accomandita Semplice, Sorbolo (IT)

( * ) Notice: Subject to any disclaimer, the term of this patent is extended or adjusted under 35 U.S.C. 154(b) by 0 days.

(21) Appl. No.: 10/432,856

(22) PCT Filed: Nov. 23, 2001

(86) PCT No.: PCT/EP01/13747

§ 371 (c)(1), (2), (4) Date: May 28, 2003

(87) PCT Pub. No.: WO02/46088

PCT Pub. Date: Jun. 13, 2002

(65) Prior Publication Data

US 2004/0033109 A1 Feb. 19, 2004

(30) Foreign Application Priority Data

Dec. 5, 2000 (IT) ................................ RE2000A000124

(51) Int. Cl.$^{7}$ ............................ F16L 3/00; B66C 23/00; B66C 23/26

(52) U.S. Cl. ................................ 405/184.5; 405/154.1; 405/184.4; 212/258; 212/261; 212/180; 414/745.6; 180/9.5

(58) Field of Search ........................... 405/184.4, 184.5, 405/154.1; 414/745.5, 745.6; 212/258, 261, 262, 260, 180, 181, 264; 180/9.5, 9.52

(56) References Cited

U.S. PATENT DOCUMENTS

| | | | | | |
|---|---|---|---|---|---|
| 1,985,285 | A | * | 12/1934 | Erdahl | 212/196 |
| 2,413,529 | A | * | 12/1946 | Casper | 212/258 |
| 2,425,663 | A | * | 4/1947 | Wooldridge | 212/258 |
| 2,712,873 | A | * | 7/1955 | Peterson | 180/9.1 |
| 3,005,559 | A | * | 10/1961 | Toderick | 212/258 |
| 3,598,347 | A | * | 8/1971 | Marburger | 212/258 |
| 3,785,503 | A | * | 1/1974 | Butterfield et al. | 212/258 |
| 4,020,952 | A | * | 5/1977 | Scodino | 414/745.6 |
| 4,132,317 | A | * | 1/1979 | Arendt et al. | 414/745.6 |
| 4,362,435 | A | * | 12/1982 | Henry | 405/184.5 |
| 4,666,049 | A | * | 5/1987 | Gilmore, Jr. | 212/261 |
| 4,682,912 | A | * | 7/1987 | Henry | 405/184.5 |
| 4,946,051 | A | * | 8/1990 | Cliff | 212/258 |
| 6,494,515 | B1 | * | 12/2002 | Kalbfleisch | 414/732 |
| 6,609,622 | B2 | * | 8/2003 | Forsyth | 212/258 |

FOREIGN PATENT DOCUMENTS

| | | | | |
|---|---|---|---|---|
| GB | 2104867 | * | 3/1983 | 212/261 |

* cited by examiner

*Primary Examiner*—Jong-Suk (James) Lee
(74) *Attorney, Agent, or Firm*—Notaro&Michalos PC

(57) ABSTRACT

An apparatus transforms a motorized frame mounted on crawler tracks and having a rotatable horizontal platform, into a pipeline laying machine or the like. A first structure is hinged to the platform on a horizontal axis at one end, at its other end, has a coupling intended to be secured to a track guide carriage. A second structure which, at its free end carries a lifting member, is hinged on a horizontal axis to the coupling.

10 Claims, 3 Drawing Sheets

APPARATUS ABLE TYPICALLY TO TRANSFORM A FRAME MOUNTED ON CRAWLER TRACKS INTO A PIPE PLAYING MACHINE

TECHNICAL FIELD

This invention relates to an apparatus by means of which a frame mounted on crawler tracks can be easily transformed into a machine for handling products and materials, such as a pipe laying machine, to which the invention relates in a particular but not exclusive manner.

BACKGROUND ART

For laying pipelines consisting of relatively large, heavy pipes, in particular of rigid type, it is known to use specific machines, known as pipe laying machines.

Pipe laying machines are known comprising, essentially, a frame with an internal combustion engine mounted on crawler tracks, a track guide carriage of which carries, hinged to its outside on a horizontal axis parallel to the longitudinal axis of the machine, the lower end of an arm arranged to swing in a vertical plane transversely to the machine, under the control of a respective motorized winch.

At the other end of the arm there is a lifting hook suspended from a cable which slides vertically under the control of another motorized winch, this also being supported by the frame.

On that side of the frame distant from that occupied by said arm, known machines sometimes present a counterweight which is hinged to the outside of the frame and of the respective track guide carriage by an articulated quadrilateral system controlled by an operating cylinder-piston unit.

Such known pipe laying machines have proved unsatisfactory because of their overall size.

In this respect, to transfer the machine from one operating position to another, typically by a bascule truck, the said arm has to be positioned almost vertically, which involves considerable complications seeing that when in said transporting configuration its upper end well exceeds the allowable limits for road transport.

Other dimensional drawbacks derive from the fact that the arm and any counterweight are hinged to the outside of the track guide carriage, i.e. beyond the transverse outline of the track-mounted frame.

Pipe laying machines also comprising a track-mounted frame with an internal combustion engine and a swinging arm with a lifting hook are known, in which the arm is supported by the frame by way of an interposed platform mounted on a thrust bearing.

Specifically, the base of the arm is hinged to said platform on a horizontal axis, the platform carrying at least one cylinder-piston unit for operating the swinging arm, a motorized winch for operating the hook, and a balancing weight situated on that side of the platform distant from the side occupied by said arm, and is arranged to slide between a position close to and a position distant from the platform.

By virtue of said thrust bearing device the swinging arm of such pipe laying machines has better manoeuvrability than the arm of the aforesaid pipe laying machines, and during machine transportation it can be advantageously orientated along the machine longitudinal axis in a flat position so that it lies within the allowable vertical dimension for road transport.

A problem inherent in such known machines derives from the fact that the entire load carried by the hook acts on the thrust bearing device, which means that it has to be dimensioned correspondingly, giving rise not only to cost problems but also to problems of reliability and durability.

The main object of this invention is to overcome the aforestated problems.

Another object of the invention is to attain this objective within the context of a simple, rational, low-cost, reliable and durable construction.

DISCLOSURE OF THE INVENTION

Said objects are attained by the characteristics indicated in the claims. In a totally general sense, the apparatus of the invention consists of a variable-profile system intended to be associated with a motorized frame mounted on crawler tracks and upperly provided with a platform mounted on a thrust bearing, in the manner of the frame of a usual bucket or shovel excavator, without requiring appreciable modifications to said frame.

Said variable-profile system, which will be described in detail hereinafter, comprises a first structure which at one end is intended to be hinged to the platform on a horizontal axis, and at the other end presents a coupling means to be connected to a track guide carriage, and a second structure which at one end is hinged to the first on a horizontal swing axis parallel to the preceding and close to said coupling means, and at its other end presents a lifting member, such as a hook.

Said system is arranged to assume a utilization configuration in which the first structure can be coupled to the outside of a track guide carriage, in order to discharge thereonto most of the load supported by said lifting member, and a non-utilization configuration in which the second structure can be positioned virtually coplanar with the first, at that moment released from the track guide carriage, i.e. in a configuration suitable for transferring the machine along the road.

The characteristics and the constructional and operational merits of the invention will be apparent from the ensuing detailed description, given with reference to the figures of the accompanying drawings which illustrate a particular preferred embodiment thereof by way of non-limiting example.

DETAILED DESCRIPTION OF THE PREFERRED EMBODIMENT

Figure 1:
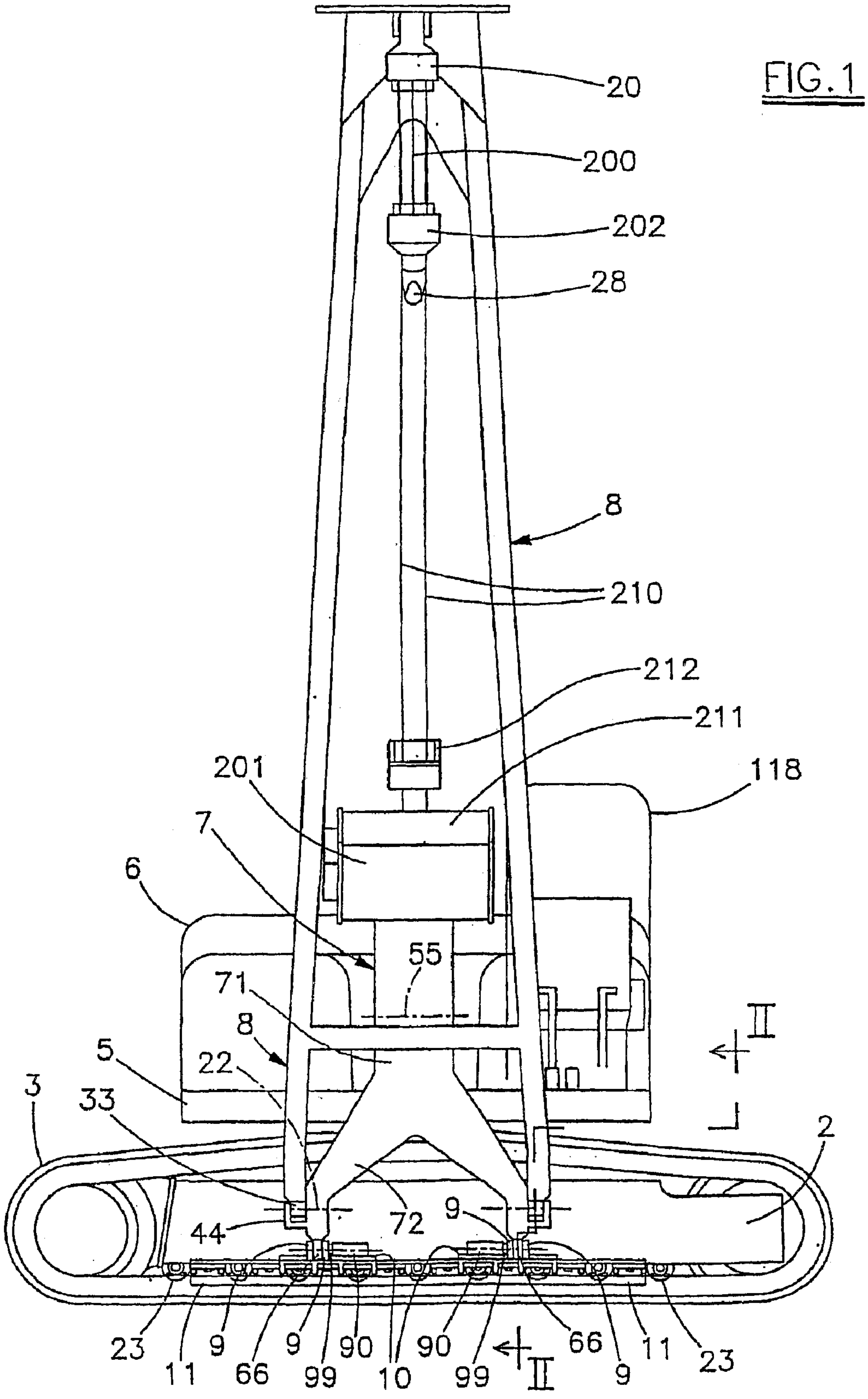
FIG. 1 is a side elevation of a tracked vehicle equipped with the invention, this latter shown in its utilization configuration.

Said figures show a robust frame 1, with the sides of which there are associated two carriages 2 for guiding respective crawler tracks 3.

On said frame 1 there is positioned a thrust bearing device 4, to the movable upper element of which there is fixed a platform 5 carrying an internal combustion engine unit 6, typically diesel, an operating cab 118, and all the hydraulic equipment for supplying pressurized oil to the control motors for the crawler tracks 3 and for the winches described hereinafter.

Figure 3:
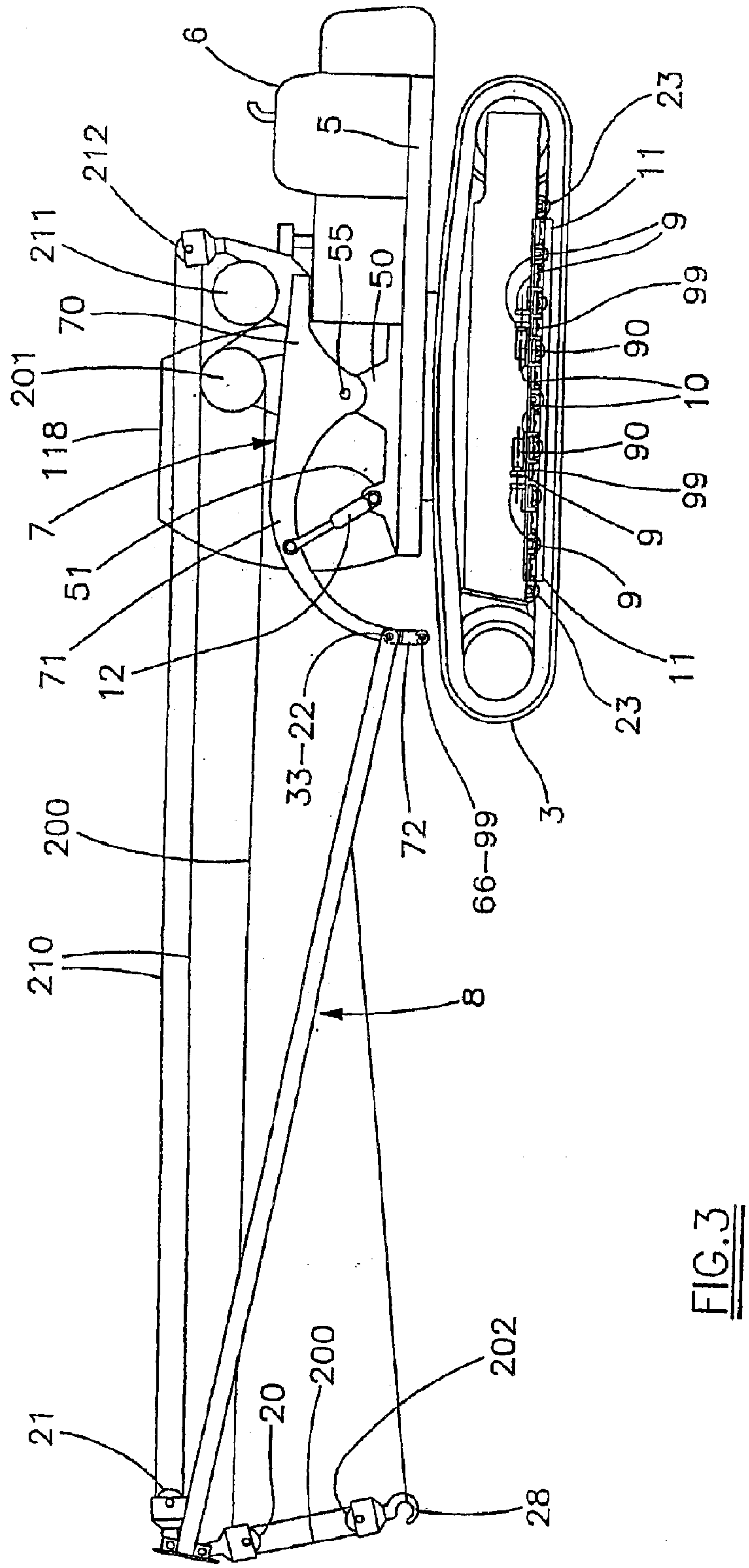
FIG. 3 is a view similar to FIG. 1, showing the invention in its non-utilization configuration, suitable for transportation of the tracked vehicle.

The platform 5 is of rectangular plan, its longitudinal axis being parallel to the axis of the frame 1 when the machine is arranged for transportation (see FIG. 3).

The combination which has just been described is of usual type, i.e. consisting of a track-mounted frame with an overlying platform mounted on a thrust bearing of the type typically used for bucket or shovel excavators.

According to the invention the said frame 1 is associated with the apparatus of the invention to form a pipe laying machine, without any need to modify the frame 1.

Figure 2:
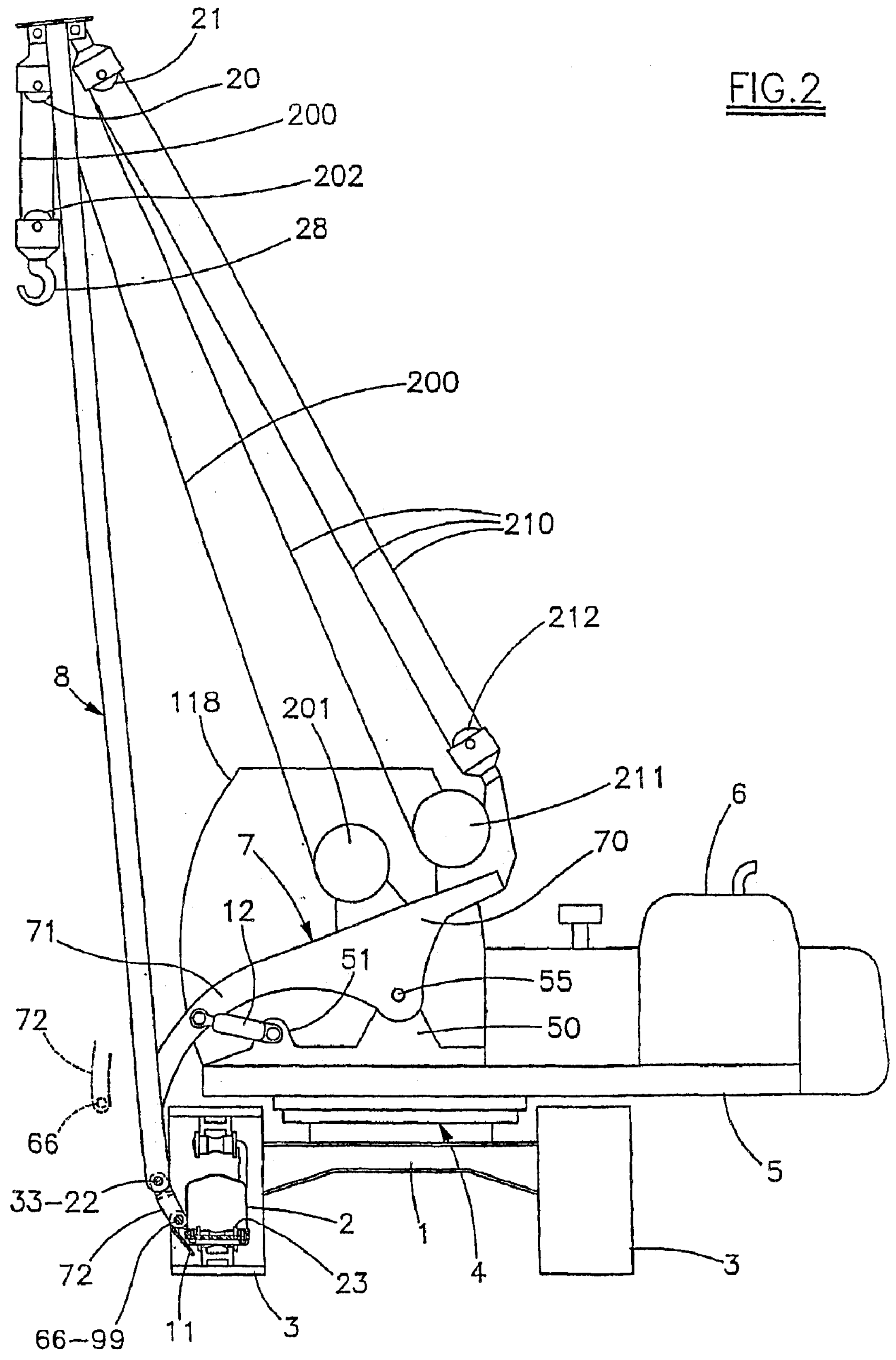
FIG. 2 is the section II—II indicated in FIG. 1.

As can be seen in FIG. 2, on the platform 5 there are defined two robust vertical holed lugs 50 and 51, which lie in a vertical plane parallel to the longitudinal axis of the platform 3.

Alternatively, said lugs 50 and 51 can be provided by a plate associated with the apparatus of the invention by being suitably fixed to the platform 5, for example by bolts. The apparatus comprises a profiled structure 7 supporting a flat structure 8 which at its end carries a lifting hook 28.

In side view (see FIG. 2), the structure 7 comprises a straight portion 70 lowerly hinged to the lug 50 on a horizontal axis 55 lying transversely to the platform 5, and a downwardly curved portion 71 extending beyond the lug 51 and the corresponding end of the platform 5, where it assumes the form of a fork 72 (see FIG. 1).

The arms of the fork 72 present respective terminal eyelets 66 the common axis of which is parallel to said horizontal axis 55.

When in the utilization configuration of FIGS. 1 and 2, said fork 72 lies external to a track guide carriage 2, its eyelets 66 being removably coupled to the lower longitudinal edge of the respective track guide configuration 2.

This latter is provided with a usual longitudinal panel 11 to protect the lower rollers 23 of the respective crawler track 3, according to the invention there being fixed to the panel 11 two plates 10. Each plate 10 presents a pair of robust holed lugs 9 for receiving the respective eyelet 66, and a locking catch 99 controlled by a hydraulic cylinder-piston unit 90.

Said plates 10 and the relative accessories are preferably provided on both the track guide carriages 2.

In addition between the lug 51 of the platform 5 and the arched portion 73 of the profiled structure 7 there is interposed a hydraulic cylinder-piston unit 12, the function of which will be apparent hereinafter (FIG. 2).

In proximity to said eyelets 66 (see FIG. 1), the arms of the fork 72 are provided externally with respective angle brackets 44, two eyelets 33 provided at the lower end of the flat structure 8 being permanently hinged to said arms and brackets 44 on a common horizontal axis 22 parallel to the axis of said eyelets 66.

Said axis 22 constitutes the swing axis of said structure 8, which is of trapezium shape (FIG. 1) and is provided upperly with two swivel blocks 21 and 22 respectively. The metal cable 210 for adjusting the inclination of the structure 8 passes about the block 21. The cable 210 has one end fixed to the drum of a respective winch 211 and its opposite end fixed to the block 21 after passing about a fixed cable terminal block 212.

The metal cable 200 for raising and lowering the hook 28 passes about the block 20, the cable 200 having one end fixed to the drum of a respective winch 201 and its opposite end fixed to the block 20 after passing about the movable cable terminal block 202 of the hook 28.

Said fixed block 212 and said winches 211 and 201 are carried by the straight portion 70 of the profiled structure 7 (FIG. 2).

The aforedescribed pipe laying machine combines the special characteristics of the two types of pipe laying machines described in the introduction, i.e. discharge of most of the weight carried by the hook 28 onto elements not forming part of the thrust bearing 4, and minimum vertical height because of the ability to lower the structure 8 along the longitudinal axis of the machine.

To arrange the pipe laying machine for road transfer by a suitable transporting vehicle, the procedure is as follows.

With the hook 28 practically completely raised, the catches 99 are firstly disengaged and the cylinder-piston unit 12 then extended, by which the eyelets 66 become positioned as shown to the left in FIG. 2 by thin dashed lines.

Having done this the platform 5 is rotated through 90°, the winch 211 is operated to lower the structure 8 until the overall assembly falls within the allowable vertical contour, and the hook 28 is immobilized for example as shown in FIG. 3. The reverse procedure is used to return the apparatus into the utilization configuration of FIGS. 1 and 2.

The merits and advantages of the invention are clearly understandable from the aforegoing and from an examination of the accompanying figures.

What is claimed is:

1. An apparatus for transferring typically into a pipe laying machine, a motorized frame mounted on crawler tracks and carrying a rotatable horizontal platform, the apparatus comprising a first structure which at one end is hinged to said platform on a horizontal first swing axis, said first structure being free for swinging responsive to first actuating means, said first structure at its other end having a coupling means connectable to a track guide carriage, and a second structure which at one end is hinged to the first structure on a horizontal second swing axis parallel to the first swing axis, the second structure being free for swinging responsive to second actuating means, said second structure at its free end carrying a lifting member responsive to third actuating means.

2. An apparatus as claimed in claim 1, wherein said first structure has at its other end, a profiled portion forming a concavity arranged to embrace a respective platform part and an upper pert of a crawler track when the apparatus is in a utilization configuration.

3. An apparatus as claimed in claim 1, wherein said coupling means of said first structure comprises at least one terminal holed element fixed thereto, and at least one mating holed member which is fixed to the outside of a base of said track guide carriage, and a locking catch associated with said track guide carriage.

4. An apparatus as claimed in claim 3, wherein said catch is controlled by a hydraulic cylinder-piston unit.

5. An apparatus as claimed in claim 1, wherein said first actuating means is an arm of variable length hinged to said platform and to said first structure for positioning said first structure in a position for its coupling to the track guide carriage and in a position for release of first said structure.

6. An apparatus as claimed in claim 5, wherein said arm of variable length is a hydraulic cylinder-piston unit.

7. An apparatus as claimed in claim 5, wherein said first structure and said arm of variable length are hinged to said platform of the frame and lugs that are rigid with said platform.

8. An apparatus as claimed in claim 5, wherein seats in which said first structure and said arm of variable length are hinged to said platform of the frame are provide by a plate fixed to the platform.

9. An apparatus according to claim 1, wherein said second actuating means comprises a cable and a winch supported by said first structure for pulling said cable.

10. An apparatus as claimed in claim 1, wherein said third actuating means comprises a cable and a winch supported by said first structure for pulling said cable.

* * * * *